May 1933.  J. B. WHITTED  1,908,390
SHOCK ABSORBER FOR VEHICLES
Filed Jan. 9, 1930   2 Sheets-Sheet 1
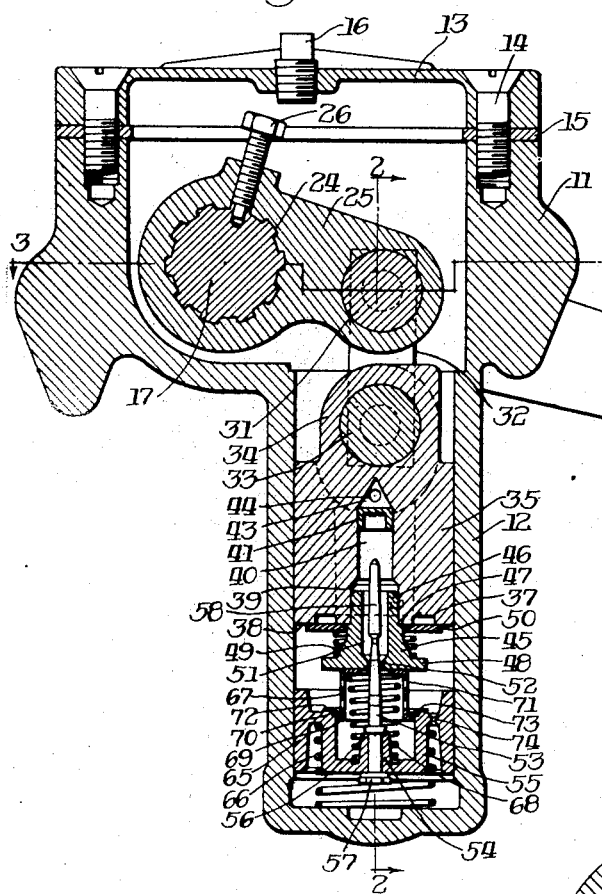
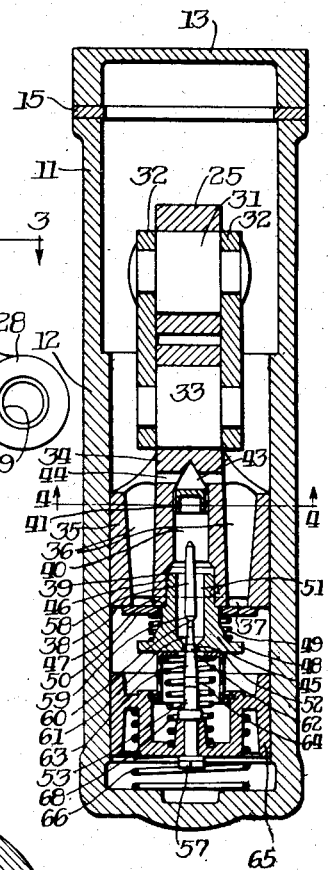
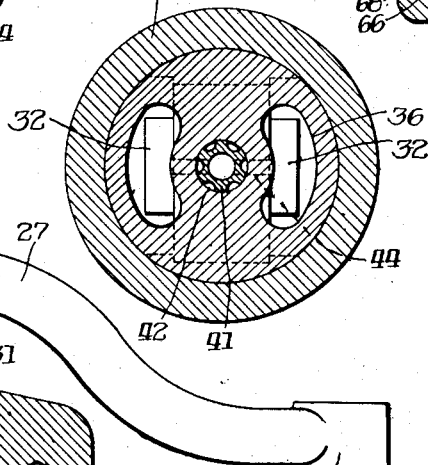
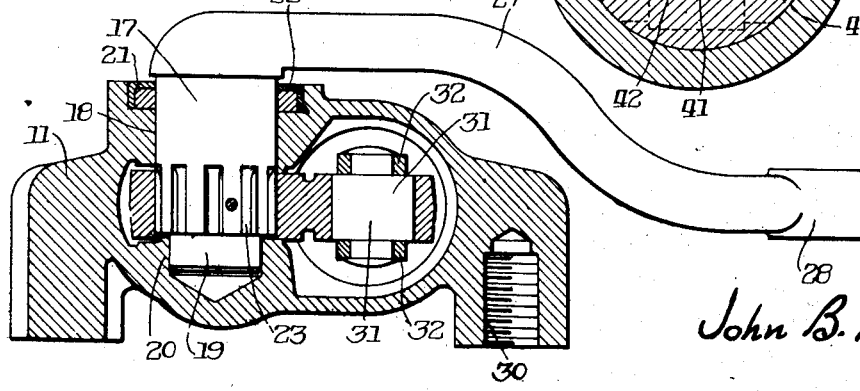
John B. Whitted
Inventor
Wilkinson, Huxley, Byron, & Knight
By Attys May 9, 1933. J. B. WHITTED 1,908,390
SHOCK ABSORBER FOR VEHICLES
Filed Jan. 9, 1930 2 Sheets-Sheet 2

John B. Whitted
Inventor

By Wilkinson, Huxley, Byron & Knight
Attys

Patented May 9, 1933

1,908,390

UNITED STATES PATENT OFFICE

JOHN B. WHITTED, OF CHICAGO, ILLINOIS

SHOCK ABSORBER FOR VEHICLES

Application filed January 9, 1930. Serial No. 419,699.

This invention relates to a new shock absorber for vehicles, and more particularly to a construction of this type having a hydraulic cushioning effect.

Shock absorbers of this character are used to connect between a vehicle body or the spring supported portion of the vehicle and the axles or some other portion of the body which is not spring supported. The effect of the shock absorber is to control the relative movement of the vehicle parts under the action of the springs. The springs should be substantially free to function normally to cushion slight shocks or vibrations, but it is desirable to cushion excessive bound and rebound action due to heavy shocks and especially to control the rebound action.

It is an object of the present invention to provide a new and improved shock absorber of the class described.

It is a further object to provide a new and improved piston construction for such shock absorbers together with associated parts for controlling the passage of fluid and for preventing noise due to such passage.

It is an additional object to provide a construction in which means are provided for cushioning rebound and for providing a cushioned limit to rebound movement.

It is also an object to provide a construction in which the parts are so designed as to reduce and prevent noise of operation of the parts.

It is a further object to provide a construction which is comparatively simple in design and composed of parts adapted for quantity production.

Other and further objects will appear as the description proceeds.

This invention is in the nature of a modification or improvement of my prior forms of construction shown in my application Serial No. 267,038 filed April 3, 1928, and my application Serial No. 297,040 filed August 2, 1928.

I have shown certain preferred embodiments of my invention in the accompanying drawings, in which—

Figure 1 is a vertical cross section through a single cylinder form of construction;

Figure 2 is a section taken on line 2—2 of Figure 1;

Figure 3 is a section taken on line 3—3 of Figure 1;

Figure 4 is a section taken on line 4—4 of Figure 2;

Figure 5:
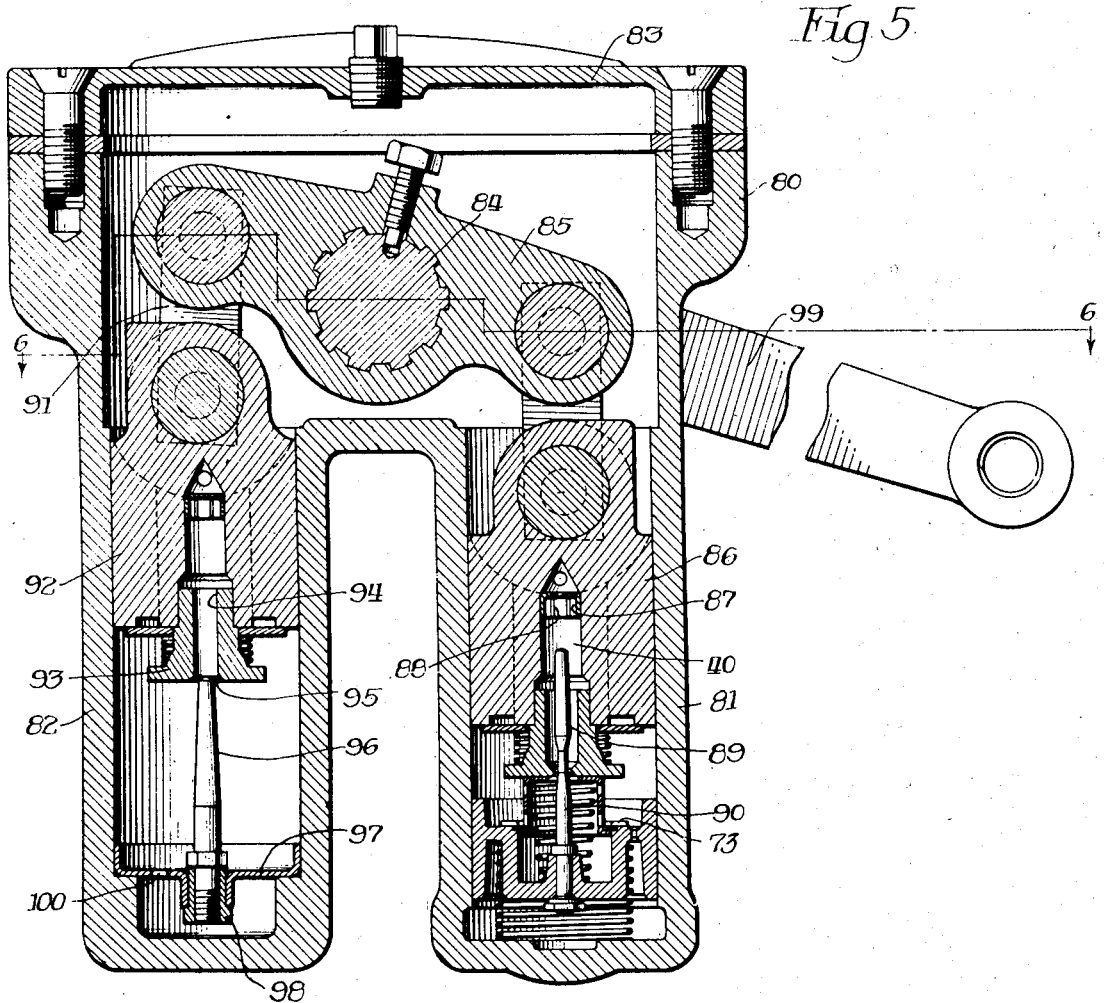
Figure 5 is a vertical section through a double cylinder form of construction.

Referring first to the form of construction shown in Figures 1 to 4, the shock absorber comprises the main casing or housing 11 having the downwardly extending cylinder portion 12. The cover 13 is secured to the housing 11 by means of the screws 14, and the gasket 15 is provided to prevent loss of oil. The filling plug 16 is screw-threaded into the top of the cover 13. The cross shaft 17 is journaled in the housing 11 at 18 and is also provided with the reduced extension 19 which is journaled in the housing at 20.

A packing 21, held in place by a spring ring 22, is provided to prevent leakage of oil around the cross shaft 17. The intermediate portion of the shaft 17 is provided with the series of recesses or grooves 23 which interfit with lugs or teeth 24 formed on the operating lever 25, which is thus keyed to the cross shaft. A set screw 26 is provided to retain the operating lever 25 in fixed relation to the cross shaft 17. The operating arm 27 is shown as formed integral with the cross shaft 17 and is provided at its free end 28 with a bearing 29 adapted to receive a connection to a link or other member for connecting the automobile to the axle or similarly movable part of the vehicle construction.

It will be understood that the housing 11 is secured to a fixed portion of the vehicle body, such, for example, as the body frame. A plurality of threaded openings 30 are provided for receiving screws to retain the housing in position in the desired location.

The operating lever 25 carries a pivot pin 31 which is connected by links 32 with the pivot pin 33 carried by the upwardly extending portion 34 of a piston 35 which fits in the cylinder portion 12 of the housing 11. This piston 35 is shown in vertical section in Figure 2, and in horizontal section in Figure 4. It is provided with the oppositely placed arcuate passages 36 for permitting the passage of oil from the top to the bottom of the piston. These passages 36 communicate with a circular groove 37 formed on the lower face 38 of the piston. The piston 35 is provided with the central bore 39 having a reduced upper portion 40 into which is fitted the cap 41. This cap 41, as shown in Figure 4, is provided with the vertically extending grooves 42 which permit the passage of fluid from the reduced bore 40 to the upper conical extension 43 of the bore. This conical portion 43 of the bore is connected to the portion of the cylinder above the piston 35 by means of the cross bore 44. The apertured plug 45 has a reduced portion 46 which makes a push fit into the bore 39 in the piston 35. A shoulder 47 bears against the lower face 38 of the piston and limits the inward movement of the plug 45.

The plug 45 is further provided with the flange 48 which supports a spring 49. This spring in turn bears against and supports a disc valve 50 which, in its upper or normal position, serves to close the circular groove 37 and consequently the passages 36 through the piston 35. The plug 45 is provided with the internal bore 51 and with the reduced aperture 52. The pin 53 extends through the aperture 52 and is supported in the central boss 54 carried by the compensating piston 55. The pin 53 has a shoulder 56 which engages the upper face of the boss 54 and its lower end is threaded to receive a nut 57.

As indicated on Figure 2, the pin 53 is provided with an upper tapering portion 58, a short sloping shoulder 59, cylindrical portions 60 and 62, a tapering portion 61 and further tapering portions 63 and 64, which may have varying tapers as shown. The purpose of these various portions of the pin will be described hereafter, and it will be understood that the pin may be somewhat modified in form and size depending upon the varying conditions to be met.

The compensating piston 55 is provided with an outer skirt 65 which has a sliding fit in the cylinder 12. This compensating piston 55 is normally thrust upwardly from the bottom of the cylinder 12 by means of the spring 66. The perforated cap 67 is carried in the upper portion of the compensating piston 55 and is thrust upwardly by the spring 68 which bears on the under side of the cap and on the upper side of the compensating piston. The spring 68 is stronger than the spring 66 so that the parts will normally be in the position shown in Figures 1 and 2, and any downward thrust upon the cap 67 will depress the spring 66 without depressing the spring 68 unless other factors such as the fluid trapped below the compensating piston, enter into the matter.

The lower edge of the cap 67 is provided with the outwardly extending flange 69 which fits under the ring 70, which is crimped into the upper portion of the compensating piston 55. The sides of the cap 67 are provided with perforations 71 to permit passage of any oil trapped between the cap and the compensating piston. It will be noted, however, that the lowermost perforations 71 are located sufficiently high so that some oil will be trapped between the flange 69 and the ring 70. This oil will leak out slowly due to the clearance of the parts, but its trapping will prevent a click as the cap reaches its upper limit of movement.

The rim 72 on the upper face of the compensating piston is adapted to be engaged by the flange 48 of the plug 45 when the cap 67 is fully depressed. This rim 72 is provided with transverse grooves 73 to permit passage of oil when the parts are fully engaged in this manner. The orifice 74 is provided extending through the compensating piston to permit passage of the oil or other fluid through the compensating piston.

Figure 6:
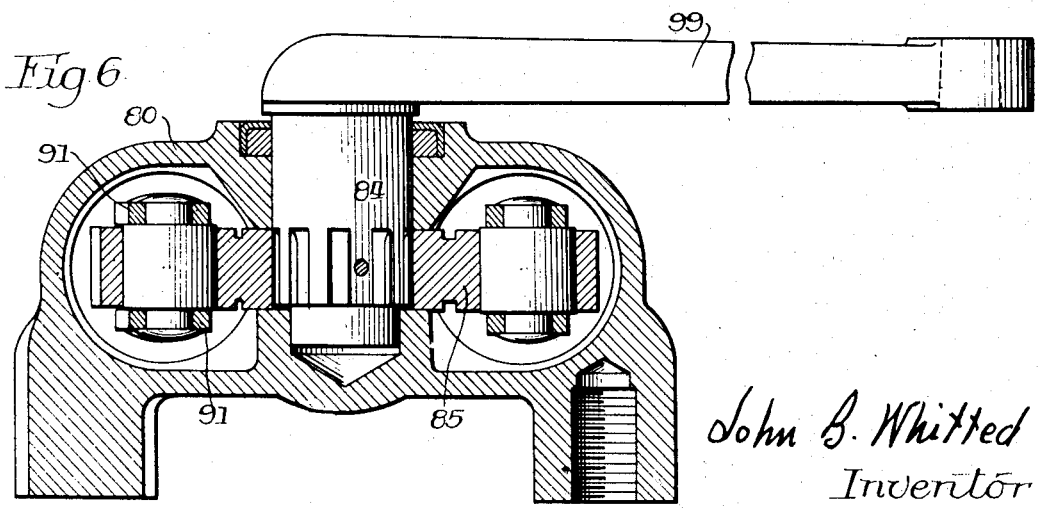
Figure 6 is a horizontal section taken on line 6—6 of Figure 5.

Referring now to the form of construction shown in Figures 5 and 6, the housing 80 is provided with the two depending cylindrical portions 81 and 82. This housing 80 is provided with the cover 83, similar to that in the previous form of construction. The cross shaft 84 has the cross arm 85 keyed thereto and this arm 85 is connected to the piston 86 in the cylinder 81 in a manner similar to that previously described. This cylinder 81 and piston 86 have parts associated therewith which are generally similar in construction and function to those shown in Figure 1.

It will be noted that the cap 87 at the upper end of the bore 40 is shown as made of pressed metal, with edges crimped at 88 to provide grooves for the passage of oil instead of the milled out member shown in Figure 1. The pin 89 is shown as of a different contour than that in the previously described construction, having a lower portion 90 which is tapered upon a variable slope. This construction otherwise is similar to that of Figure 1.

The opposite end of the cross arm 85 is connected by links 91 with the piston 92. This piston is similar in construction to that previously described. It is provided with the plug 93 which has a bore 94 therein, this bore being of uniform cross sectional area throughout its length and merely having its lower edge chamfered at 95 to facilitate flow of the fluid. The tapered pin 96 is secured in place in the bottom of the cylinder by means of the flange 97 which is pressed in place. Flange 97 is provided with the orifice 100 to permit the equalization of pressure on both sides of the flange. The pin 96 is secured in the flange by means of the nut 98. This form of construction is provided with the operating arm 99 which is shown as integral with the cross shaft 84, this arm 99 being straight rather than offset as the construction shown in Figure 3. The particular form of these arms, however, may be varied to suit the different vehicle constructions, and forms in itself no part of the present invention.

In the operation of the form of apparatus shown in Figures 1 to 4, it will be understood that the housing and its contained parts, are secured to the vehicle body and therefore move vertically on bound and rebound. The end 28 of the operating arm is connected by a link or other means to the axle or to some fixed portion of the structure which is not supported by the springs and which therefore does not move up and down with the body. For the purpose of considering the action of the parts therefore, it may be considered that the point 28 is fixed and that the body of the construction moves up and down with the vehicle body. When the vehicle strikes an obstruction or depression in the roadway so that the body swings down towards the axle comprising the springs, the housing 11 will move downwardly. This movement, since the point 28 is fixed, will cause the operating arm 27 to move in the counterclockwise direction about the cross shaft 17. This will also have the effect of moving the operating lever 25 in the counterclockwise direction about the axis of the cross shaft 17. This movement will cause the connecting links 33 to draw the piston 35 upwardly in the cylinder 12.

It will be understood that the housing will be filled with oil or other suitable liquid to a point at least above the top of the cylinder itself. As the piston moves upwardly, the oil above the piston will pass downwardly through the passages 36 and through the ring groove 37 into the space between the piston 35 and the compensating piston 55. This movement of the oil will unseat the disc valve 50 against the resistance of the spring 49. As the piston moves upwardly the aperture 52 in the plug 45 will pass upwardly relative to the pin 53. This has no appreciable effect, however, on the flow of oil through the piston, as the openings afforded by the passages 36 very greatly exceed that afforded around the pin, and the pin has no retarding effect on the movement.

As the plug 45 moves away from contact with the cap 67, the entire compensating piston assembly tends to be forced upwardly by the spring 66. This spring may be quite light, however, and exert a pressure, for example, on the order of four pounds. The space below the compensating piston 55 must be filled by oil in order for the light spring to move the piston, since the spring is not sufficiently strong to overcome atmospheric pressure. This oil can get under the compensating piston 55 only by passing through the very small orifice 74. Consequently, upward movement of the compensating piston is very slow. The up and down movements of a car under road vibrations are quite rapid so that the compensating piston will not ordinarily move more than a few thousandths of an inch at most before the plug 45 again engages the cap 67.

After the vehicle body reaches its downward limit of movement it starts upwardly on its rebound movement under the influence of the compressed vehicle springs. This upward movement causes the operating lever 25 to, in effect, move in the clockwise direction about the axis of the cross shaft 17, and by means of the links 33 force the piston 35 downwardly in the cylinder 12. As soon as this movement starts, the pressure of the oil against the under side of the disc valve 50, aided by the spring 49, closes that valve.

The only way remaining for the oil trapped under the piston to escape, is through the orifice 52 around the pin 53. At the start of this movement the orifice 52 will surround some portion of the upper tapered portion 58 of the pin, assuming that the shock has been moderately heavy. As the piston 35 and plug 45 move downwardly, the orifice 52 moves downwardly along this tapering portion 58, causing the orifice to be progressively decreased in area. As the vehicle body approaches its normal position the orifice 52 passes over the shoulder 59 and across the intermediate reduced section 61 of the pin. This section is located so that the orifice passes over it during a movement of the vehicle body a comparatively slight distance either above or below the normal position. As the upward movement of the vehicle body continues, the plug 45 engages the cap 67 and depresses the cap into the compensating piston 55. During this movement of the cap 67 the oil below the piston and external of the cap can pass into the cap through the orifices 71 so as to pass upwardly through the orifice about the pin. Also, the oil trapped between the cap and the compensating piston may pass out through this same orifice.

During this portion of the movement, the part of the pin passing through the orifice also gradually increases in diameter so as to reduce the effective by-pass for the oil and consequently gradually retard the upward movement of the vehicle body on rebound beyond its normal position. The spring 68 also affords some slight resistance to this downward movement of the cap 67.

When the flange 48 on the plug 45 engages the rim 72 on the upper face of the compensating piston 55, if there is any further movement of the piston it must be had by forcing downwardly the compensating piston. This piston can be forced down very slowly as the oil under it leaks out through the small orifice 74 and passes through the grooves 73 in the rim 72 so as to get out through the orifice 52 surrounding the pin 53. It will be apparent, therefore, that there is no abrupt stop as the vehicle body reaches its limit of rebound, but the stop is somewhat cushioned by the movement of the compensating piston if the shock is so heavy as to bring the plug into engagement with the piston. As the vehicle body comes down again towards the normal or neutral position, the disc valve 50 will open and there will be no retarding effect. It will be apparent therefore that this construction serves to retard only the rebound of the vehicle and not to retard the downward movement of the vehicle body, whether under the initial shock or occurring after rebound.

It will be understood that the aggregate opening afforded by the grooves in the cap 41 in this form of construction will always exceed the opening between the pin and the orifice 52, so that the effective trapping of oil will be by the pin and the orifice and not by the cap 41. Similarly, the cross bore 44 should exceed in area the openings through the cap 41. The reduced upper portion 40 of the central bore 39, together with its closure cap 41, are highly important in preventing a noise or squeal due to the passage of the oil at high velocity and pressure through the orifice 52 about the pin. This chamber and its exit openings through the cap 41 serve as a secondary reduction in the velocity of the oil, and the upper conical portion 43 of the bore and the cross bore 44 serve as a third pressure reduction chamber, so that there will be no noise or squeal by the oil as it passes out into the upper portion of the cylinder above the piston.

It will be understood that in the normal use of a vehicle to which the shock absorber may be attached, it may carry loads having a wide variation at different times in its use. If the pin 53 were permanently located in the bottom of the cylinder this would mean that the relation of the orifice 52 to the pin would vary, depending upon the load in the vehicle. This would be highly undesirable as the load might be such as to locate the orifice opposite an enlarged portion of the pin in normal position of the vehicle body under the load. This would mean that there would be retardation of even a very slight upward movement of the vehicle body and would consequently make it very unpleasant to the riders. It is important that the orifice be located opposite a portion of the pin which is quite reduced in size in order to permit comparatively free passage of the oil if the vehicle is to ride easily under slight vibrations. The vehicle springs themselves will afford the desired cushioning effect to offset such vibrations and any action of the shock absorber relative to such vibrations would nullify the spring action and make the vehicle ride as though it were not spring suspended. The shock absorber should only come into action when vibrations beyond the normal slight ripple are felt.

The compensating piston 55, therefore, is provided to support the pin 53 in order that it may be normally supported at such point as to interpose its narrow portion in the orifice 52 regardless of the load in the vehicle. For example, if the load in a vehicle having a shock absorber construction attached thereto with parts as shown in Figure 1, were so modified as to move the housing 11 downwardly, as, for example, by the entrance of additional passengers into the vehicle, the piston 35 would be drawn upwardly. This would bring the plug 45 out of contact with the cap 67. This, however, would be a substantially permanent movement and there would be no immediate reverse movement of the piston as long as the load in the vehicle remained the same. The spring 66 will slowly force the compensating piston upwardly as the oil leaks under the piston through the opening 74. This will continue until the cap 67 engages the lower face of the plug 45. The pin will then again be so related to the orifice 52 as to bring that orifice around the desired reduced portion of the pin.

Similarly, whenever the load is varied by such a change as to cause the piston 35 to move downwardly in the cylinder, the cap 67 will be compressed into the compensating piston 55 and the orifice 52 would be located over an enlarged portion of the pin. The spring 68, however, exceeds in strength the spring 66. The relation, for example, of the powers of springs may be in the nature of 10 to 4. The spring 68 therefore forces the compensating piston 55 downwardly, the oil trapped below the piston gradually flowing out through orifice 74 until the flange 69 on the lower edge of the cap again seats against the ring 70. This again brings the orifice 52 around the reduced portion of the pin 53. As has been previously stated, the relation of the springs and orifices is such that the compensating piston can only move very slowly. Its speed of movement is such that it does not move appreciably during the normal up and down vibration of the vehicle body under a road shock. It will move slowly, however, and adjust itself when the load is changed to modify the normal position of the vehicle body relative to the axles.

In the form of construction shown in Figures 5 and 6, the operation of the parts shown in the right-hand cylinder 81 is substantially identical with that of the parts in the single cylinder of the construction previously described. The taper of the pin 90 has been shown as somewhat different so that the application of the resistance to the movement will be varied slightly from that offered by the construction shown in Figure 1. It will be apparent that the resistance to be offered to different vehicles of different weights and of different spring suspensions should be varied. It is possible to vary the control of this construction by merely a modification of the shape or size of the pin 53 or 90, as shown in Figures 1 and 5, without variation of any other parts of the construction. These pins, therefore, may be designed to suit the particular type or model of vehicle so as to afford the desired cushioning effect.

The construction shown in the left-hand cylinder 82 of Figure 5 is designed to cushion the downward movement of the vehicle body toward the axle, which, as has been stated, is not particularly affected by the construction in the single cylinder design of Figure 1 or by the right-hand cylinder in the design of Figure 5. As the vehicle body moves downwardly towards the axle, the operating lever 85 will move in a counterclockwise direction about the axis of the cross shaft 84. This will force the piston 92 downwardly in the cylinder 82. As this movement starts, the effective passage area between the tapered pin 90 and the cylindrical orifice 94 will be at its maximum. As the movement continues downwardly this effective area will be decreased until at the maximum limit of movement the area may be very small. This will therefore serve to cushion the downward movement of the vehicle.

As the vehicle body starts upwardly on rebound, the disc valve carried by the piston 92 will open under pressure of the downwardly flowing oil and the piston 92 will have substantially no effect on the movement. This upward movement will be controlled by the mechanism in the right-hand cylinder 81, as has been previously described. It has not been found necessary to utilize any compensating piston for carrying the pin 96 in the cylinder 82. The point of effective closing off of orifice 94 as the orifice reaches the cylindrical lower portion of pin 96 remains in the same relation to the axles of the vehicle regardless of variation in normal position of the vehicle springs due to load. This should be maintained as the cushioning effect should be completed before the springs have permitted the body to reach the axles so as to avoid sudden jar. While the effective area past the pin will be somewhat reduced when the vehicle is more heavily loaded, it will not be reduced to such a point as to cause excessive stiffness in the riding qualities of the vehicle. It is desirable to increase the resistance to the start of downward movement when the body of the car is heavily loaded, and this is effectively accomplished by the structure shown.

While I have shown certain preferred embodiments of my invention by way of example, it is capable of further changes and modifications to meet varying cosditions of application and of use, and I contemplate such changes and variations as come within the spirit and scope of the appended claims.

I claim:

1. In a shock absorber, a cylinder, a piston movable therein, said piston having a central bore formed therein, means for controlling the flow of fluid into the lower end of the bore, and means fitted in an intermediate portion of the bore permitting a limited flow to the top portion of the bore.

2. In a shock absorber, a cylinder, a piston movable therein, said piston having a central bore formed therein, means for controlling the flow of fluid into the lower end of the bore, and means fitted in an intermediate portion of the bore permitting a limited flow to the top portion of the bore, the piston having an opening formed therein communicating between the top portion of the bore and the upper side of the piston.

3. In a shock absorber, a cylinder, a piston movable therein, said piston having a central bore formed therein, means for controlling the flow of fluid into the lower end of the bore, and means fitted in an intermediate portion of the bore permitting a limited flow to the top portion of the bore, the piston having an opening formed therein communicating between the top portion of the bore and the upper side of the piston, the means fitted in the bore permitting a greater flow than the lower control, and the opening from the top portion of the bore permitting a greater flow than the means fitted in the bore.

4. In a shock absorber, a cylinder, a piston movable therein, said piston having a central bore formed therein, means for controlling the flow of fluid into the lower end of the bore, and a cap fixedly fitted into the bore and having passages between its edges and the sides of the bore.

5. In a shock absorber, a cylinder, a piston movable therein, said piston having a central bore formed therein, a reduced connection between the upper portion of the bore and the upper side of the piston, and a member fitted into an intermediate portion of said bore to limit the effective passage area for fluid.

6. In a shock absorber, a piston assembly having an orifice therein, a pin extending into said orifice, a compensating piston carrying said pin, a flange on the compensating piston adapted to engage the lower face of the piston assembly, said flange having transverse grooves formed therein.

7. In a shock absorber, a piston assembly having an orifice therein, a pin extending into said orifice, a compensating piston carrying said pin, a cap yieldingly carried by the compensating piston and adapted to engage the lower face of the piston assembly, a flange on the compensating piston limiting outward movement of the cap, and a flange on the cap adapted to trap oil against the compensating piston flange.

8. In a shock absorber, a pair of cylinders, pistons in said cylinders, a rock shaft connected to both said pistons, said pistons having orifices formed therein, a pin fixedly secured in one cylinder coacting with the orifice in the piston therein, and a pin carried by a second piston in the other cylinder and coacting with the orifice formed in the piston therein.

9. In a shock absorber, a pair of cylinders, pistons in said cylinders, a rock shaft connected to both said pistons, said pistons having orifices formed therein, a pin fixedly secured in one cylinder coacting with the orifice in the piston therein, and a pin carried by a second piston in the other cylinder and coacting with the orifice formed in the piston therein, said second piston being provided with means adapted to normally maintain it a predetermined distance from the other piston in said cylinder.

10. In a shock absorber, a pair of cylinders, pistons in said cylinders, a rock shaft connected to both said pistons, said pistons having orifices formed therein, a pin carried by a flange removably fitted in the bottom of one of said cylinders cooperating with the orifice in the piston therein, and a second pin carried by a second movable piston in the other cylinder and cooperating with the orifice in the piston in said cylinder.

11. In a shock absorber, a pair of cylinders, pistons in said cylinders, a rock shaft connected to both said pistons, said pistons having orifices formed therein, a pin fixedly secured in one cylinder coacting with the orifice in the piston therein, and a pin carried by a second piston in the other cylinder and coacting with the orifice formed in the piston therein, the fixedly secured pin tapering outwardly from its upper portion towards its base, and the pin carried by the second piston in the other cylinder having an intermediate reduced portion and tapered end portions.

12. A device for controlling the movements of two relatively movable members comprising, in combination, a casing presenting a fluid reservoir and two cylinders, said casing being secured to one of said movable members; a piston in each cylinder operatively connected to the other movable member, each piston forming a compression chamber in its respective cylinder and each having a passage for the transfer of fluid from the respective compression chamber to the fluid reservoir; a metering pin supported in the one cylinder so as to be immovable longitudinally, said metering pin controlling the flow of fluid through its respective piston passage in accordance with the position of the piston in its cylinder; and a metering pin in the other cylinder for controlling the flow of fluid through the passage of the piston in said cylinder, said metering pin being movable longitudinally to maintain its position relative to the piston substantially only in response to the movements of the piston due to variations in the static load upon one of the movable members.

Signed at Chicago, Illinois, this 24 day of December, 1929.

JOHN B. WHITTED.